US007695361B2

(12) United States Patent
Lind et al.

(10) Patent No.: US 7,695,361 B2
(45) **Date of Patent: *Apr. 13, 2010**

(54) PRIZE ASSIGNMENT METHOD AND PROGRAM PRODUCT FOR BINGO-TYPE GAMES

(75) Inventors: Clifton E. Lind, Austin, TX (US); Gary L. Loebig, Austin, TX (US); Jefferson C. Lind, Austin, TX (US); Joseph R. Enzminger, Austin, TX (US); John E. Padgett, Austin, TX (US); Martin A. Keane, Chicago, IL (US); David M. Brandt, San Antonio, TX (US)

(73) Assignee: Multimedia Games, Inc., Austin, TX (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/238,313

(22) Filed: Sep. 10, 2002

(65) Prior Publication Data

US 2004/0048647 A1 Mar. 11, 2004

Related U.S. Application Data

(63) Continuation-in-part of application No. 09/836,993, filed on Apr. 18, 2001, now Pat. No. 6,569,017.

(51) Int. Cl.

| | |
|---|---|
| ***A63F 3/06*** | (2006.01) |
| ***A63F 13/10*** | (2006.01) |
| ***G06Q 50/00*** | (2006.01) |
| ***G06Q 60/00*** | (2006.01) |
| *A63F 9/24* | (2006.01) |

(52) U.S. Cl. ............................. 463/19; 463/22; 463/25

(58) Field of Classification Search ............ 463/16–28; 273/269, 270
See application file for complete search history.

(56) References Cited

U.S. PATENT DOCUMENTS 4,560,171 A * 12/1985 Anthony .................... 273/269

(Continued)

FOREIGN PATENT DOCUMENTS

| | | | |
|---|---|---|---|
| EP | 0 984 408 A2 | | 8/2000 |
| WO | WO 2004/105903 A1 | * | 9/2004 |

OTHER PUBLICATIONS

Fey, Slot Machines A Pictorial History of the First 100 Years, 1997, pp. 243-244.*

(Continued)

*Primary Examiner*—Matthew D. Hoel
(74) *Attorney, Agent, or Firm*—Russell D. Culbertson; J P Cody

(57) ABSTRACT

A pattern probability (302) is determined for each of a number of target patterns (301) achievable in a bingo-type game. Each pattern probability (302) comprises a probability of achieving the respective target pattern (301) in the bingo-type game. Different pattern sets are then associated with each different prize level in a desired prize distribution. The target patterns (301) and their respective pattern probabilities (302) are assigned or mapped to the different pattern sets so that the probability of achieving any target pattern included in a pattern set comprises a value approximating the desired probability of the prize level with which the pattern set is associated.

16 Claims, 7 Drawing Sheets

U.S. PATENT DOCUMENTS

| | | | | |
|---|---|---|---|---|
| 4,661,906 | A * | 4/1987 | DiFrancesco et al. | 463/19 |
| 4,858,932 | A | 8/1989 | Keane | |
| 4,991,848 | A | 2/1991 | Greenwood et al. | |
| 5,042,809 | A * | 8/1991 | Richardson | 463/18 |
| 5,169,147 | A * | 12/1992 | Hamano | 463/21 |
| 5,209,479 | A * | 5/1993 | Nagao et al. | 463/21 |
| 5,275,400 | A | 1/1994 | Weingardt et al. | |
| 5,324,035 | A * | 6/1994 | Morris et al. | 463/42 |
| 5,393,057 | A * | 2/1995 | Marnell, II | 463/13 |
| 5,401,023 | A | 3/1995 | Wood | |
| 5,423,539 | A * | 6/1995 | Nagao | 463/20 |
| 5,423,541 | A | 6/1995 | Nicastro et al. | |
| 5,482,289 | A * | 1/1996 | Weingardt | 273/269 |
| 5,511,784 | A * | 4/1996 | Furry et al. | 273/143 R |
| 5,639,088 | A | 6/1997 | Schneider et al. | |
| 5,727,786 | A * | 3/1998 | Weingardt | 273/269 |
| 5,782,470 | A * | 7/1998 | Langan | 273/139 |
| 5,813,911 | A * | 9/1998 | Margolin | 463/19 |
| 5,909,875 | A * | 6/1999 | Weingardt | 273/269 |
| 6,003,867 | A * | 12/1999 | Rodesch et al. | 273/143 R |
| 6,068,552 | A * | 5/2000 | Walker et al. | 463/21 |
| 6,077,079 | A * | 6/2000 | Barnes | 434/128 |
| 6,079,711 | A * | 6/2000 | Wei et al. | 273/269 |
| 6,113,492 | A * | 9/2000 | Walker et al. | 463/16 |
| 6,117,009 | A * | 9/2000 | Yoseloff | 463/20 |
| 6,149,156 | A * | 11/2000 | Feola | 273/292 |
| 6,159,096 | A * | 12/2000 | Yoseloff | 463/20 |
| 6,213,877 | B1 * | 4/2001 | Walker et al. | 463/26 |
| 6,296,250 | B1 * | 10/2001 | Langan | 273/139 |
| 6,331,143 | B1 * | 12/2001 | Yoseloff | 463/18 |
| 6,368,214 | B1 * | 4/2002 | Luciano | 463/18 |
| 6,398,645 | B1 * | 6/2002 | Yoseloff | 463/19 |
| 6,565,091 | B2 * | 5/2003 | Weingardt | 273/269 |
| 6,569,017 | B2 | 5/2003 | Enzminger et al. | |
| 6,581,935 | B1 * | 6/2003 | Odom | 273/269 |
| 6,585,266 | B1 * | 7/2003 | Lovell | 273/269 |
| 6,656,044 | B1 * | 12/2003 | Lewis | 463/19 |
| 6,739,970 | B2 * | 5/2004 | Luciano | 463/18 |
| 6,988,948 | B2 * | 1/2006 | Perrie et al. | 463/25 |
| 2001/0031659 | A1 * | 10/2001 | Perrie et al. | 463/18 |
| 2002/0117803 | A1 * | 8/2002 | Weingardt | 273/269 |
| 2004/0023715 | A1 * | 2/2004 | Luciano et al. | 463/25 |

OTHER PUBLICATIONS

Durango Bill's Bingo Probabilities Analysis. www.durangobill.com.*

Durango Bill's Applied Mathematics for PowerBall Probabilities. www.durangobill.com.*

Durango Bill's Applied Mathematics for Mega Millions Odds. www.durangobill.com.*

How They Work. www.wizardofodds.com. Jul. 15, 2001.*

Slot Machine Appendix. www.wizardofodds.com. Sep. 19, 2001.*

Slot Machine Appendix 4. www.wizardofodds.com. Sep. 19, 2001.*

Slot Machine Appendix 5. www.wizardofodds.com. Oct. 25, 2002.*

"The Everything Casino Gambling Book," 2nd ed., by Meg Elaine Schneider, (c) 2004 F+W Publications, Inc., chapters in bingo and keno.*

"Bingo Combos," by Paul Fredericks, (c) 1992 Bingo Directories.*

"Bingo Combos," by Paul Fredericks, 1992, Bingo Directories, Oakland, California.*

"Scarne's Complete Guide to Gambling," by John Scarne, 1961, Simon & Schuster, New York, N.Y., chapter on bingo.*

Fredericks, Paul. Bingo Combos: Bingo Combinations, Patterns, and Diagrams, 1992, 52 pages, Bingo Directories, Oakland, CA.

National Indian Gaming Commission, Letter to Montgomery dated Nov. 2, 1999, re: opinion on Evergreen Bingo, 3 pages.

"EverGreen and Tooty Frooty Bingo. Same Game, Two Names." Brochure, 2 pages, Dec. 1998.

* cited by examiner

| PRIZE LEVEL | PROBABILITY | PRIZE |
|---|---|---|
| 0 | .299 | $N_0$ |
| 1 | .3 | $N_1$ |
| 2 | .25 | $N_2$ |
| 3 | .15 | $N_3$ |
| 4 | .001 | $N_4$ |

300 301 302

| PATTERN ID | TARGET PATTERN | PATTERN PROBABILITY |
|---|---|---|
| P1 | STRAIGHT LINE | .2 |
| P2 | LETTER X | .1 |
| P3 | LETTER L | .1 |
| P4 | LETTER C | .05 |
| P5 | 4 CORNERS | .1 |
| P6 | SMALL FLAG | .05 |
| P7 | LARGE FLAG | .025 |
| P8 | SMALL BOX | .05 |
| P9 | LARGE BOX | .025 |
| P10 | BLACKOUT | .001 |
| P11 | NOTHING/OTHERS | .299 |

FIG. 3

| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 4

| PRIZE LEVEL | PROBABILITY | PRIZE | PATTERN SET |
|---|---|---|---|
| 0 | .299 | $N_0$ | P11 (.299) |
| 1 | .3 | $N_1$ | P1, P2 (.2+.1=.3) |
| 2 | .25 | $N_2$ | P3, P4, P5 (.1+.05+.1=.25) |
| 3 | .15 | $N_3$ | P6, P7, P8, P9 (.05+.025+.05+.025=.15) |
| 4 | .001 | $N_4$ | P10 (.001) |

FIG. 5

| PRIZE LEVEL | PROBABILITY | PRIZE |
|---|---|---|
| 0 | .299 | $X_0$ |
| 1 | .35 | $X_1$ |
| 2 | .2 | $X_2$ |
| 3 | .1 | $X_3$ |
| 4 | .05 | $X_4$ |
| 5 | .001 | $X_5$ |

FIG. 6

| PRIZE LEVEL | PROBABILITY | PRIZE | PATTERN SET |
|---|---|---|---|
| 0 | .299 | $X_0$ | P11 (.299) |
| 1 | .35 | $X_1$ | P1, P2, P4 (.2+.1+.05=.35) |
| 2 | .2 | $X_2$ | P3, P5 (.1+.1=.2) |
| 3 | .1 | $X_3$ | P6, P8 (.05+.05=.1) |
| 4 | .05 | $X_4$ | P7, P9 (.025+.025=.05) |
| 5 | .001 | $X_5$ | P10 (.001) |

FIG. 7

PRIZE ASSIGNMENT METHOD AND PROGRAM PRODUCT FOR BINGO-TYPE GAMES

CROSS-REFERENCE TO RELATED APPLICATION

This application is a continuation-in-part of U.S. patent application Ser. No. 09/836,993, filed Apr. 18, 2001, and (now U.S. Pat. No. 6,569,017) entitled "Method for Assigning Prizes in Bingo-Type Games." The Applicants hereby claim the benefit of this non-provisional patent application under 35 U.S.C. §120. The entire content of this non-provisional patent application is incorporated herein by this reference.

TECHNICAL FIELD OF THE INVENTION

This invention relates to bingo-type gaming systems. More particularly, the invention relates to a method for assigning prizes from a number of different prize levels available in a bingo-type game.

BACKGROUND OF THE INVENTION

Numerous gaming systems have been developed in which participants may be awarded prizes based on the result or outcome of a game play. The outcome of a game play in a gaming system may be determined in a number of different fashions. Video and electronic games available in casinos may determine a win or loss for each play of the game according to some algorithm. Lottery-type games rely on predetermined game records which are analogous to lottery tickets. Each game record is predetermined as being a winning or losing record, and winning records are associated with some prize. These predetermined game records are distributed to players in the course of game play, and a player receiving a winning record is entitled to the prize associated with that record.

Bingo-type games make up another general class of gaming systems. A bingo-type game is played with predetermined cards that include a number of designations randomly arranged in a grid of spots or locations. The cards may be physically printed on paper or another suitable material, or may be represented by a data structure which defines the various card locations and designations associated with the locations. In the course of play, designations are randomly selected from a pool of available designations and matched to the designations on the card. A card having matching designations arranged in some predetermined pattern is considered a winning card.

A new type of gaming system is disclosed in U.S. patent application Ser. No. 10/028,889 (now U.S. Pat. No. 6,802,776) entitled "Method and Program Product for Producing and Using Game Play Records in a Bingo-Type Game." The entire content of this patent application is incorporated herein by this reference. This gaming system uses predetermined bingo-type cards, each card comprising a grid or other structure of locations and each location associated with one of a number of designations available in the game. Outcomes in the game are determined by matching randomly selected designations with the designations on the player cards as in any bingo-type game. However, the matches and thus winning and losing player cards are determined prior to distributing the cards to the players. The matched or "daubed" cards are distributed in some random order to players in response to game play requests from the players. Preferably, each player card and each matched player card is represented by a data structure, and the data structure itself and/or related data for a matched card is distributed to a player in response to a request for a play in the game. The players make these game play requests through player terminals which are in communication with a central computer used to distribute the matched game cards and/or data from the matched game cards.

Lottery-type games are each associated with a prize distribution or prize table. The prize table assigns the various outcomes in the game to different prize levels. For example, a prize table may be patterned on a poker game with various poker hands related to the various prize levels in the game. In this example, the poker hand representation is a graphic representation of the outcome in the game. The different possible hands are each associated with, or assigned to, a particular prize level in the prize table. Other prize tables may have a reel-type game (slot machine) theme, some other traditional casino game theme, or a theme totally unrelated to traditional gaming.

It is desirable for the games available at a particular gaming establishment to have a variety of different prize distributions. This variety in prize distributions helps maintain player interest and makes the gaming experience more exciting. It is also desirable that each particular prize distribution include a diverse set of the available prizes. A diverse set of prizes available in a game helps make the game more interesting and enjoyable to the players.

One problem with bingo-type games is that the probability of winning or losing with a particular card is always determined by a fixed set of constraints. These constraints include the number of designations available in the pool of designations, the predetermined pattern or patterns to be matched, and the number of locations on the card (or card data structure). For a given set of constraints, the probabilities of winning and losing are generally fixed. Although it is possible to vary these bingo probabilities by varying these constraints, varying the constraints may be cumbersome. Also, even varying the constraints for the bingo game has only a limited effect on the resulting bingo probabilities, that is, the probabilities of winning a prize in a particular bingo game.

Using bingo game probabilities to determine prize levels in a bingo-type game such as that described in U.S. Pat. No. 6,802,776 would constrain the possible prize distribution for the game and prevent the use of a desirable prize table/prize distribution. It is therefore desirable to develop some new method of assigning or distributing prizes in bingo-type games in general, and particularly the bingo-type game described in U.S. Pat. No. 6,802,776.

SUMMARY OF THE INVENTION

The present invention provides a method for creating desirable and diverse prize distributions for different bingo-type games. The invention encompasses methods and program products for developing a desirable prize distribution for a bingo-type game, and for assigning prizes in a bingo-type game.

A method according to the invention includes defining a number of target patterns achievable in the game. A method according to the invention also includes associating or mapping a different pattern set to at least one of the different prize levels in a desired prize distribution. The target patterns are assigned or mapped to the different pattern sets so that at least one pattern set includes more than one target pattern and so that the probability of achieving any target pattern included in the respective pattern set represents or comprises a value approximating the desired probability of the prize level with which the pattern set is associated. By mapping multiple target patterns to the pattern sets in this way, a bingo-type game prize distribution is not constrained to the bingo probabilities associated with achieving individual patterns in the game. The invention preferably utilizes at least one and preferably two or more pattern sets including multiple target patterns. One or more pattern sets may include only a single mapped target pattern.

The target patterns may be any patterns that may be achieved in a bingo-type game. For example, a card for a bingo-type game may include a grid of the 5×5 spots or locations, with a designation associated with each location in the grid. A target pattern within the scope of the invention may be any pattern which may be produced by the locations on the card. A target pattern may, for example, comprise a straight line of five locations, or two diagonal lines of locations forming an "X." Also, target patterns within the scope of the invention may be defined by the order in which card locations are matched, the particular designation matched at a particular card location, and/or when a particular location or designation match is made in a called or drawn sequence of designations in a game. Target patterns may be defined generally in any fashion providing a precise target pattern definition, even if the pattern does not form an identifiable shape.

It should be noted that two or more target patterns may be defined using the identical group of spots or locations on a bingo card or card representation. Thus, the card spots or locations themselves may make up only a portion of the target pattern definition. The remainder of the target pattern definition may, for example, comprise a rule as to when a spot is matched relative to the other spots or what specific designation is matched at a particular spot.

Some forms of the invention utilize an individual pattern probability associated with each respective target pattern. This pattern probability is the probability of a player achieving that particular pattern under the rules of play in the bingo-type game and under the rules making up the target pattern definition. Forms of the invention utilizing individual pattern probabilities define the patterns so that the individual pattern probabilities are useful in determining the overall probability associated with a pattern set. In other forms of the invention, target patterns may be defined such that the individual pattern probabilities overlap with each other.

A desired prize distribution or prize table within the scope of the present invention will include a number of different prize levels. Each prize level in a desired prize distribution is associated with both a prize and a desired probability of winning that prize in the course of game play. It is important to note that according to the invention, a desired prize distribution may be any prize distribution. In particular, a desired prize distribution may be a distribution associated with some preexisting game such as a traditional poker game for example. A primary advantage of the present invention is that prizes may be awarded from the bingo-type game to approximate any desired prize distribution and yet the individual prizes are determined by the underlying bingo-type game which is subject to the relatively fixed bingo probabilities.

The step of associating or mapping target patterns to the pattern sets/prize levels may be accomplished in many different ways. For example, the target patterns may be chosen manually for inclusion in a particular pattern set, or chosen according to some rule. Target patterns may also be selected for the various pattern sets in some automated fashion according to an algorithm. The only constraint according to the present invention is that probability of achieving any target pattern included in a given pattern set must comprise a value which approximates the probability of the prize level with which that pattern set is associated. It will be appreciated that the pattern probabilities in a given pattern set may not total exactly to the desired prize level probability. However, it is the goal of the invention to associate or map target patterns to pattern sets so that the probability of achieving any target pattern in the given pattern set is approximately equal to the probability of the respective prize level with which the pattern set is associated. The allowable variation between the probability of achieving any pattern in a pattern set and the respective prize level probability may be significant, however, in every case the target patterns and respective pattern probabilities are selected for inclusion in a pattern set based at least partially upon the desired prize level probability with which the pattern set is associated.

According to the present invention, prizes from the desired prize distribution or prize table are awarded in the bingo-type game according to the pattern set in which an achieved target pattern is included. For example, a prize level associated with prize X in a given prize distribution may be associated or mapped to a pattern set including three target patterns, patterns A, B, and C. A player holding a card that achieves pattern A in the bingo-type game will be awarded this prize X. Players holding cards that achieve target patterns B and C will also be awarded prize X.

An advantage of the present invention is that once pattern probabilities are determined for a bingo-type game under given rules of play, these probabilities may be used to develop a number of different prize distributions or prize tables for games using the same underlying bingo-type game. Specifically, after target patterns are mapped to the various prize levels of a first desired prize distribution, the method according to the invention may include mapping target patterns to additional pattern sets associated with prize levels of an entirely different prize distribution or prize table. Once again, each target pattern is mapped to the various additional pattern sets so that the probability of obtaining any target pattern included in a given additional pattern set is approximately equal to the probability of the additional prize level with which the respective additional pattern set is associated.

These and other objects, advantages, and features of the invention will be apparent from the following description of the preferred embodiments, considered along with the accompanying drawings.

BRIEF DESCRIPTION OF THE DRAWINGS

FIG. 3 shows a group of pattern probabilities for a bingo-type game.

FIG. 4 shows a grid which may be used in a bingo-type game employing the target patterns defined in FIG. 3.

FIG. 5 is a table showing pattern sets mapped to the various prize levels of the prize distribution shown in FIG. 1, and showing the target patterns of FIG. 3 mapped to the various pattern sets.

FIG. 6 shows an additional or alternative prize distribution which may be used according to the present invention.

FIG. 7 is a table showing pattern sets mapped to the various prize levels of the prize distribution shown in FIG. 6, and showing the target patterns of FIG. 3 mapped to the various pattern sets.

DESCRIPTION OF THE PREFERRED EMBODIMENTS

Figures 1, 2:
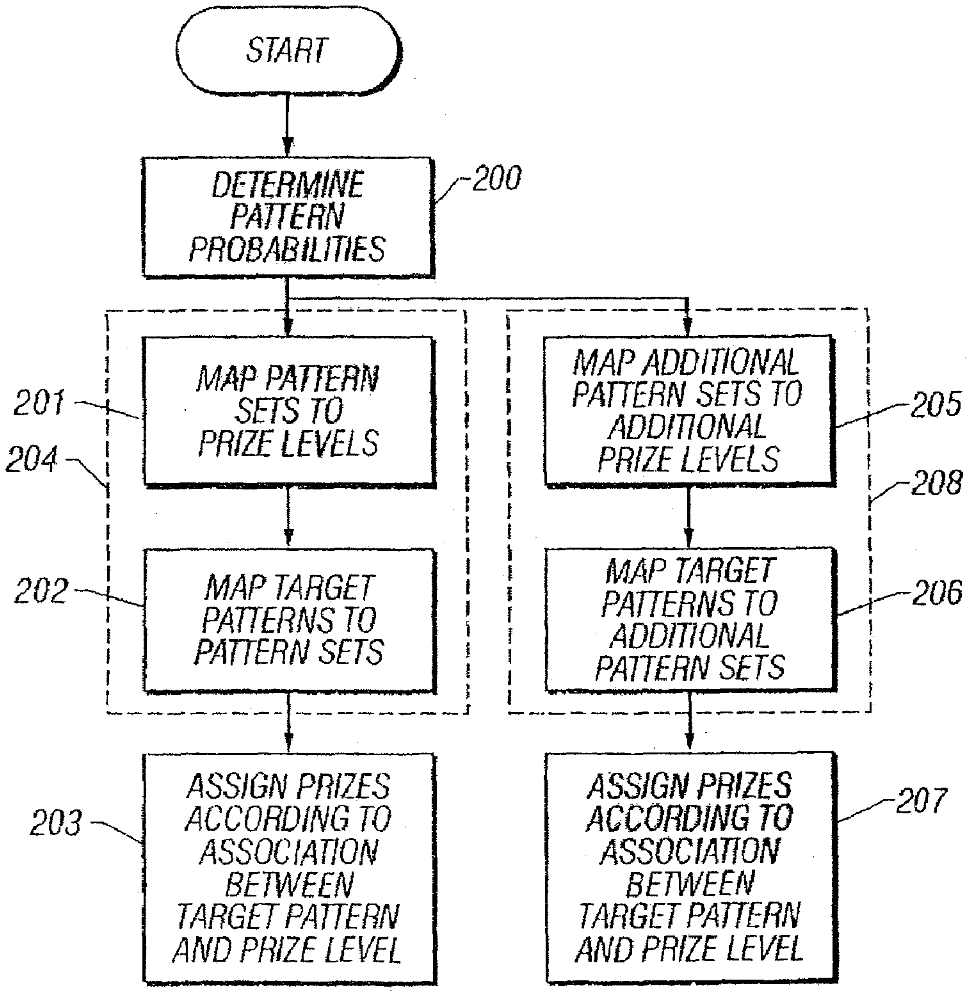
FIG. 1 shows an example prize distribution or prize table which may be used according to the present invention.
FIG. 2 is a flow chart showing the process steps according to one embodiment of the present invention.

FIG. 1 shows a prize distribution or prize table with which the present invention may be employed. The prize distribution shown in FIG. 1 includes five prize levels, levels 0 through 4. The first column of FIG. 1 shows the prize level, while the second column shows an exemplary desired probability for winning at that particular prize level in the game. For example, level 0 is associated with the probability 0.299. The final column in each entry in FIG. 1 contains a prize value associated with the particular prize level. Prize level 0 is associated with prize value $N_0$, for example.

The prize levels and probabilities for a prize distribution within the scope of the invention may be developed in any suitable manner. Developing prize distributions in gaming systems is well known in the art and will not be described further here so as not to obscure the invention in unnecessary detail. It will be appreciated that a prize distribution that may be used with the present invention is not limited to five levels as shown for purposes of example in FIG. 1, and is not limited to any particular probability at each level. A prize distribution used with the invention may have more or fewer prize levels than the five shown in FIG. 1. The prize levels may be chosen to imitate a pre-existing game, or an entirely new type of game. It will also be appreciated that each prize level in a prize distribution may be associated with several different prize values. The different prize values may correspond to different wagers that may be made in a game that uses the prize distribution.

Referring now to FIG. 2, one preferred method according to the invention includes determining the probabilities for several target patterns which may be achieved in a bingo-type game under given rules of play. This pattern probability determination step is shown at process block 200 in FIG. 2 and encompasses the step of first defining a number of target patterns achievable in the game. FIG. 3 shows a number of different target patterns, each target pattern associated with an example pattern probability. Each row in FIG. 3 is dedicated to a particular target pattern and includes a target pattern label or identifier 300 in the first column, a target pattern definition or description 301 in the second column, and the actual probability 302 of achieving that target pattern in the final column. For example, the first row in FIG. 3 shows that the target pattern "straight line" is associated with the probability 0.2 and for purposes of this disclosure is identified with the label P1. The number of patterns shown in FIG. 3 is shown only for purposes of description. More or fewer pattern definitions may be used according to the present invention. Also, it should be noted that the example probability values shown in the final column of FIG. 3 are purely fictional and are selected simply for convenience in describing the present invention. Depending upon the rules of game play in the bingo-type game, many different probabilities may be created for the described patterns. Also, it should be noted that a pattern used in the invention may be an identifiable pattern, an unidentifiable pattern, or a composite of the two. For example, a pattern may be defined as a pattern for the letter "M." Another pattern may be defined as a pattern making the letter "M," plus any one or more other locations on the grid. Yet another pattern may be defined as some arbitrary arrangement of daubed locations on a grid.

The patterns described in FIG. 3 are patterns suitable for use in a game using game cards each comprising or representing a grid, with each location on the grid associated with a designation or indicia. FIG. 4 shows such a grid having five columns and five rows. Each location is labeled in the drawing with a numerical identifier for purposes of describing the present invention. The designations which would be associated with the various locations are not shown in FIG. 4. With the grid-type game card shown in FIG. 4, the target pattern identified at P3 in FIG. 3, the "letter L" target pattern, is defined by locations 1, 6, 11, 16, 21, 22, 23, 24, and 25. A straight line identified as target pattern P1 may be any straight line of locations on the grid such as the top row locations 1, 2, 3, 4, and 5, or the diagonal line defined by locations 1, 7, 13, 19, and 25 for example.

It will be appreciated that the grid-type game card shown in FIG. 4 is shown only for purposes of example. The invention is not limited to that particular card definition or to target patterns which may be defined in the illustrated 5×5 grid in FIG. 4 or any other size of grid. Rather, the present invention has application to any bingo-type or pattern matching game using predefined cards with a predefined designation distribution, where the outcome of the game for a particular card is determined by the pattern formed on the card when the card designations are matched to designations randomly selected from a pool of designations.

Individual pattern probabilities may be determined manually or in some automated fashion. Automated pattern probability determination may be performed using a suitable processing device operating under the control of pattern probability determining program code.

Referring again to FIG. 2, once the pattern probabilities are determined for the bingo-type game employing the target patterns defined in FIG. 3, the method includes the step of associating or mapping a different pattern set to each prize level in the desired prize distribution. This mapping step is shown at process block 201 in FIG. 2. As shown at block 202 in FIG. 2, the method also includes associating or mapping the various target patterns to each pattern set. FIG. 5 shows example pattern sets for the prize distribution shown in FIG. 1 and the target patterns shown in FIG. 3. According to the invention, the target patterns are mapped to the pattern sets so that the probability of achieving any target pattern included in a respective pattern set comprises a value approximating the desired probability of the respective prize level to which the respective pattern set is associated. According to this particular embodiment of the invention, the pattern probabilities in each pattern set add together to produce a numerical value approximating the probability associated with the respective prize level to which the pattern set is mapped. Referring to the first row in FIG. 5 for example, prize level 0 is associated with or mapped to a pattern set shown in the final column and comprising target pattern P11. This target pattern encompasses all patterns other than the patterns defined in FIG. 3. The pattern probability associated with this target pattern is shown in parentheses in the final column of FIG. 5 and equals the probability associated with prize level 0. Referring to prize level 1, the pattern probabilities associated with target patterns P1 and P2 sum together to equal 0.3, the desired probability associated with prize level 1. For prize level 2, the pattern probabilities associated with patterns P3, P4, and P5 add together to equal 0.25, the probability associated with prize level 2. Referring to the next row down in FIG. 5 for prize level 3, the probabilities associated with target patterns P6, P7, P8, and P9 add together to 0.15, which is the probability associated with prize level 3. The pattern set shown in the final row of FIG. 5 is mapped to prize level 4. This pattern set includes only a single target pattern, pattern P10. The pattern probability of target pattern P10 equals the desired probability associated with prize level 4, 0.001. The associations between various target patterns that may be achieved in a bingo-type game and the respective prize levels of the desired prize distribution as shown in FIG. 5 represent a data structure and may be used to assign prizes in the bingo-type game as described further below.

As indicated by the dashed box 204 around process blocks 201 and 202, the individual steps of mapping pattern sets to the various prize levels and mapping target patterns to those sets may be thought of as a single step. That is, the invention is not limited to first assigning or mapping pattern sets to the various prize levels and then assigning or mapping target patterns to the various pattern sets. The act of assigning or mapping a given target pattern or target pattern probability to a prize level effectively maps or associates a pattern set with the prize level. That associated set includes the mapped target pattern or target pattern probability and may include other target patterns or target pattern probabilities that may be mapped to that prize level.

The steps of assigning pattern sets to the various prize levels and populating those pattern sets by mapping target patterns to the various pattern sets may be performed manually or through suitable data processing equipment. Automated pattern set mapping may be performed under the control of pattern set defining program code. The target pattern mapping step may be performed under the control of pattern mapping program code.

Referring again to FIG. 2, once the target patterns are mapped to the prize levels as indicated at process block 202, prizes may be distributed or assigned in a game based on the association or relationship between the target patterns achieved in a game and the respective prize levels to which those target patterns are mapped. This assignment of prizes is shown at process block 203 in FIG. 2. For example, assume that a player holds a game card which produces a straight line in the play of the bingo-type game. The straight line target pattern P1 is mapped to prize level 1 as shown in FIG. 5. Thus, the player is awarded the prize associated with prize level 1, prize $N_1$ shown in FIG. 5. As another example, assume a player holds a game card which produces the letter "C" pattern in the course of play. This letter "C" pattern is shown as target pattern P4 in FIG. 3. Since target pattern P4 is included in the pattern set mapped to prize level 2 as shown in FIG. 5, the player holding the game card producing the "C" target pattern is awarded prize $N_2$ associated with prize level 2. As yet another example, assume a player in the bingo-type game holds a card that produces a "black out" (target pattern P10) in the course of play. Target pattern P10 is mapped to prize level 4, and thus the player holding this card is awarded prize $N_4$, associated with prize level 4.

In a real time bingo game using prize distribution according to the invention, the assignment of prizes may be performed by a suitable processing arrangement under the control of operational program code. Pattern search program code executed by a processing device may search a number of pattern sets for a target pattern achieved in the game. Locating the pattern set for the achieved target pattern also locates the prize level and prize associated with the achieved target pattern. Once the prize is identified, prize assignment program code executed by the processing device may assign the identified prize to a player in the game who achieved the target pattern. Such an automated system may also be used in a gaming system in which the bingo cards are matched prior to assignment to players. In that case, the prize is assigned to a player card rather than the player, and then the card may be assigned to a player to distribute the assigned prize.

As indicated at process block 205 in FIG. 2, the method according to the invention may also include associating or mapping a pattern set to each prize level of an additional or second prize distribution. The method may further include mapping target patterns to each additional pattern set as shown at process block 206. Similar to the steps shown at process blocks 201 and 202, the steps shown at process blocks 205 and 206 may be considered a single step as indicated by dashed box 208.

FIG. 6 shows an additional prize distribution or prize table which is different from the prize distribution shown in FIG. 1. Not only are the probabilities associated with some of the prize levels different from those shown in FIG. 1, but also the prize distribution shown in FIG. 6 includes six prize levels. The pattern sets and target patterns mapped according to these six different prize levels are shown in FIG. 7. In this case, target pattern P1 is mapped to the pattern set associated with prize level 1. Target patterns P2 and P4 are also mapped to the pattern set associated with prize level 1. Once again, the pattern probabilities are included in each pattern set so that the probability of obtaining any target pattern comprises a numerical value which approximates the probability associated with the prize level to which the pattern set is mapped. In the example shown in the second row of FIG. 7 for prize level 1, the probabilities of target patterns P1, P2, and P4 (0.2, 0.1, and 0.05, respectively) add up to 0.35, the desired probability of winning at prize level 1 in the prize distribution shown in FIGS. 6 and 7.

Once the target patterns (and effectively the pattern probabilities in this example) are mapped, prizes may be assigned to game players based on the association between the target patterns and the respective prize levels to which they are mapped. This prize assignment step is shown at process block 207 in FIG. 2. For example, for the mapping shown in FIG. 7, a player holding a card that produces a straight line in the course of the bingo-type game is awarded the prize associated with prize level 1. A player holding a card that produces a letter "C" target pattern, pattern P4, is awarded the prize associated with prize level 1. Note that target pattern P4 is mapped to prize level 2 in the example shown in FIG. 5, but mapped to prize level 1 in the example shown in FIG. 7.

It will be noted by comparing FIGS. 5 and 7, that the very same group of target patterns and pattern probabilities (shown in FIG. 3) may be mapped according to the invention to produce two entirely different prize distributions for distributing prizes in the bingo-type game for which the target patterns are defined. Depending upon the number of target patterns, the same target patterns may be mapped in many different ways to produce numerous different prize distributions. These different prize distributions may be used for numerous different games portrayed to game players. Yet the outcome of a play in each game is determined entirely by the underlying matched pattern, just as in any bingo-type game, whether the designations for a game are produced using an object draw system or are randomly selected in some other way.

In the examples shown in FIGS. 5 and 7, the pattern probabilities mapped to the various pattern sets each add up exactly to the desired prize probability associated with the prize level to which the target patterns are mapped. These simple examples are shown only for purposes of convenience and to facilitate the description of the invention. It will be appreciated that in a real world example of target patterns, it may not be possible to map the target patterns so that probability values add up exactly to the desired prize level probabilities. However, it is the goal of the present invention that the target patterns may be mapped to approximate the desired prize level probabilities. As used in this disclosure and the accompanying claims, the word "approximate" is used in connection with the target pattern combinations in a pattern set to indicate that the target patterns are chosen for the set with the desired prize level probability in mind. A large variety of target patterns may be defined in order to help facilitate the desired approximation of prize level probabilities. Having a relatively larger number of target patterns which may be mapped provides relatively more flexibility in producing pattern sets that can approximate the desired prize level probabilities.

Although the pattern probabilities may be determined in any fashion, they will in any case be dependent upon the rules of play for the underlying bingo-type game. Those rules of play may be selected to provide a diverse group of pattern probabilities for mapping to the various pattern sets according to the invention. The rules of play for the underlying bingo-type game are preferably chosen to ensure no player has an advantage over the other players in the game. One preferred implementation uses a card perm of five by five bingo cards with each of the twenty-five locations on each card associated with a number from 1 through 75. The card perm is limited so that every number shows up 81 times and so that each card is unique, that is, no two cards have the same 25 numbers. This results in a perm of 243 cards.

This preferred implementation defines the "stop pattern" for the bingo-type game as a blackout pattern in which all locations on a card are matched by numbers drawn randomly from the pool of numbers 1 through 75. The numbers are chosen randomly using a ball draw device or ball draw simulation device in which 75 balls are marked with the numbers 1 through 75, mixed together and then drawn randomly to produce the desired random sequence of numbers. This example implementation is limited to use only games that end on exactly 65 balls. All other games are discarded. Approximately 15 percent of all games should end on exactly 65 balls. For each game, the perm of 243 cards is shuffled so that the cards are in a random order. Balls are then drawn from the pool of balls numbered 1 through 75, and on each draw the cards are evaluated one at a time in the shuffled order to determine if the stop pattern has been produced on any card. If the stop pattern is produced on a single card before the 65th ball is drawn or where no stop pattern is detected after the 65th ball is drawn, the game is discarded and the process begins again. If the stop pattern is detected on the 65th ball, all cards in the randomly shuffled perm after the first detected stop pattern are discarded and all cards before the card which achieved the stop pattern are evaluated for other patterns which are defined as some level of winning pattern. The resulting set of cards containing both winning and losing cards is then made available for distribution of cards to players as described in U.S. Pat. No. 6,802,776 entitled "Method and Program Product for Producing and Using Game Play Records in a Bingo-Type Game."

Based on these rules of play for the bingo-type game, the probability of each individual target pattern occurring is determined through simulation or other suitable technique. In this form of the invention, once the probabilities are determined, the pattern set and target pattern mapping steps shown in FIG. 2 are performed. In the example implementation, the stop pattern is assigned to the highest probability prize level in the desired prize distribution. Starting next with the highest, least probable prize level in the prize distribution and the least probable individual pattern probability, the individual target patterns are mapped to that prize level until the individual pattern probabilities total to near the desired prize level probability for that prize level. Once target patterns are mapped to the least probable prize level in the desired prize distribution, mapping continues with the pattern set for the next least probable prize level in the prize distribution using the remaining target patterns and target probabilities. The process continues until all target patterns have been mapped.

In another implementation of the invention, pattern sets are limited to patterns which produce some recognizable arrangement, or patterns which include the recognizable arrangement. For example, a pattern set may be based upon patterns in a five-by-five bingo card or card representation that make up at least the letter "M." This "M" pattern would be defined by locations 1, 6, 11, 16, 21, 7, 13, 9, 5, 10, 15, 20, and 25 in the card shown in FIG. 4. The pattern set would include this "M" pattern and patterns which make the letter "M" plus have additional locations daubed, locations 2 and 3 in FIG. 4 for example. It will be appreciated that this implementation of the invention requires that the base recognizable pattern (or patterns) for each pattern set be selected carefully so that the probabilities of the patterns in that resulting set combine to the desired prize level probability. It will also be appreciated that the patterns which fall in a given pattern set (according to a particular rule) must be removed from the available pool of patterns which may be assigned to other pattern sets. That is, a given pattern may be assigned only to a single pattern set according to the preferred form of the invention. Otherwise a given pattern could be associated with more than one prize level, which would generally be an undesirable result.

In the above examples described with reference to FIGS. 3 through 7, the pattern probabilities are assumed to be unique with no probability overlap between target patterns. Thus, the probabilities of the target patterns mapped to a given pattern set simply add together. For example, assuming no probability overlap between three target patterns X, Y, and Z assigned to a given pattern set, the probability of achieving any target pattern in the pattern set, that is, pattern X or Y or Z, is equal to the probability of achieving pattern X plus the probability of achieving pattern Y plus the probability of achieving pattern Z. However, target patterns may be defined in a bingo-type game so that there is some overlap between the probabilities of the target patterns occurring in the game. In these cases, the overlapping pattern probabilities associated with target patterns will not simply add together. Rather, the probability of achieving any target pattern in a pattern set containing multiple patterns may be determined by the relationship or interaction between the different target patterns. However, target patterns having overlapped probabilities are still mapped to pattern sets, according to the invention, so that the probability of achieving any target pattern in the respective pattern set approximates the desired prize level probability for the prize level with which the set is associated.

Figure 8:
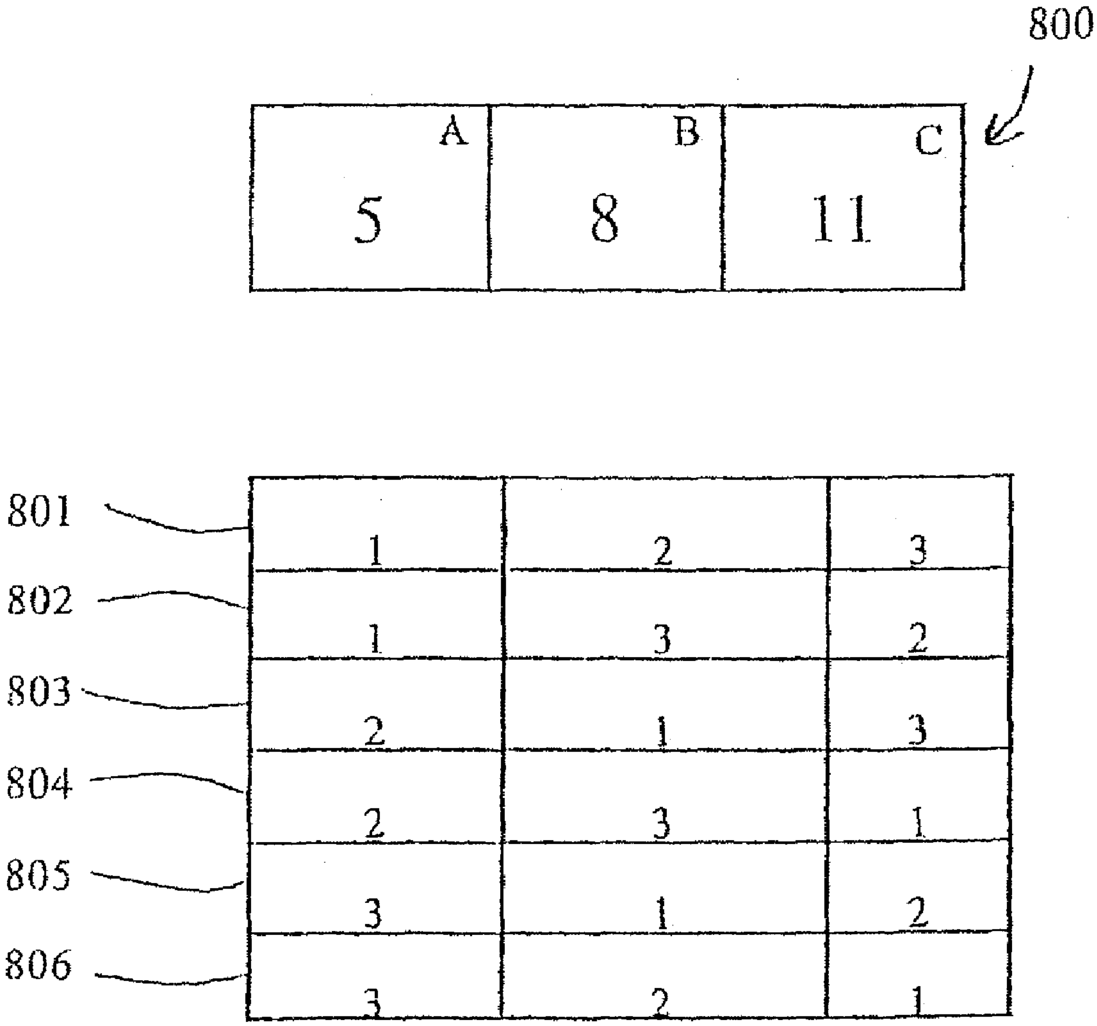
FIG. 8 is a representation of a three-spot bingo card together with a table showing the possible matching orders for the card.

To illustrate a case in which pattern probabilities overlap, assume a bingo-type game is played with a set of game cards having three different locations arranged in a line and identified as locations A, B, and C. FIG. 8 illustrates such a three-spot bingo card generally at reference numeral 800. As in any bingo-type game, each card location will generally include a designation that may be matched from a pool of designations used in the game. The example card representation 800 shown in FIG. 8 includes the number "5" at location A, the number "8" at location B, and the number "11" at location C. It will be appreciated that the locations marked A, B, and C will not normally be marked on the card representation, and are shown in the illustration in the upper right corner of each spot only to facilitate the description of the card representation and the example game.

For purposes of this example, further assume that the bingo game ends when one card matches all three spots. Prizes are awarded to the player holding the game ending card according to some target pattern that may have been produced on the card. Target patterns in this game may be defined in terms of the order in which the different card locations are matched on the card in the course of a game, in terms of the particular designation matched at a particular location, and/or the number of designations called in the game to achieve matches at the various locations, for example.

To illustrate the effect of overlapping target pattern probabilities in the present invention, assume that one target pattern T1 is defined as a match of the first card location on the respective card before any other locations on the card are matched. Assume also that another target pattern T2 is defined as a match of the last card location on a respective card last after all other locations on that card have been matched earlier in the game. The table in FIG. 8 shows that there are six different possible orders in which the three card locations A, B, and C may be matched in the course of the game. The six different matching orders are shown by reference numerals 801 through 806. Of the six different possible matching orders, two fit the definition of target pattern T1. Specifically, possible matching orders 801 and 802 each include card location A matched first. Thus, the target pattern probability for pattern T1 is equal to 2/6. Similarly, two different possible matching orders, matching orders 801 and 803, fit the definition of target pattern T2. Thus, the target pattern probability for pattern T2 is also equal to 2/6. However, if these two target patterns are included in the same pattern set according to the present invention, the probabilities do not combine by simply summing the two individual probability values. Rather, the interaction or relationship between the two target patterns must be considered in combining the probabilities associated with the two target patterns. In the example of target patterns T1 and T2, three of the six matching orders, matching orders 801, 802, and 803, fit the definition of either target pattern T1 or T2. Thus, the probability of achieving any of the two patterns is equal to 3/6, rather than the sum of the two individual pattern probabilities. The reason that the pattern probabilities associated with target patterns T1 and T2 do not simply add together is that one of the possible matching orders, matching order 802, fits the definition of both target patterns. That is, the probability of achieving pattern T1 overlaps with the probability of achieving pattern T2.

The three-spot bingo game described above with reference to FIG. 8 provides a simple example of a situation in which target patterns are defined such that their respective pattern probabilities overlap and thus do not simply add together when the patterns are assigned to a common pattern set. However, the present invention is not limited to this simple example of overlapping probabilities. Rather, the invention encompasses every way in which target patterns may combine to produce a desired probability for a given pattern set, whether the probabilities truly sum together or otherwise.

A game using a traditional 5 by 5 bingo card or card representation may be used as another example of the present invention in which pattern probabilities overlap. In this example, a first target pattern may be defined as a match of all five spots representing the top row of the 5 by 5 grid. A second pattern may be defined as a match of all five spots representing the left most column of the 5 by 5 grid. These two target patterns share the same probability of occurrence in the bingo game. However, should the two patterns be assigned to the same pattern set according to the invention, the probability of obtaining any one of the two patterns on a given designation called in the game is not the sum of the two probabilities. Rather, because the two patterns share a common spot or card location, the probability of obtaining any one of the two patterns is somewhat less than the sum of the two individual pattern probabilities. Again, the present invention encompasses the manner in which these two target patterns combine to produce a desired probability value for the combination of patterns.

Only two target patterns with overlapping pattern probabilities were described in the previous two examples. It will be appreciated that more than two patterns with overlapping pattern probabilities may be assigned to a pattern set to produce the desired overall pattern set probability according to the invention. Also, target patterns may be assigned to a pattern set such that two or more of the pattern probabilities overlap while the pattern probabilities associated with other target patterns in the set do not overlap with any of the other pattern probabilities.

It will be noted that in forms of the invention in which all pattern probabilities in a given pattern set overlap with each other and thus do not simply add together, it is not necessarily helpful to determine the individual pattern probabilities. In these situations, the method of the invention may eliminate the individual pattern probability determining step and include the steps of defining the target patterns and then mapping the target patterns to the various pattern sets. Target patterns will still be mapped to pattern sets so that the probability of achieving any pattern in the respective pattern set comprises a value approximating the desired prize level probability.

Figure 9:
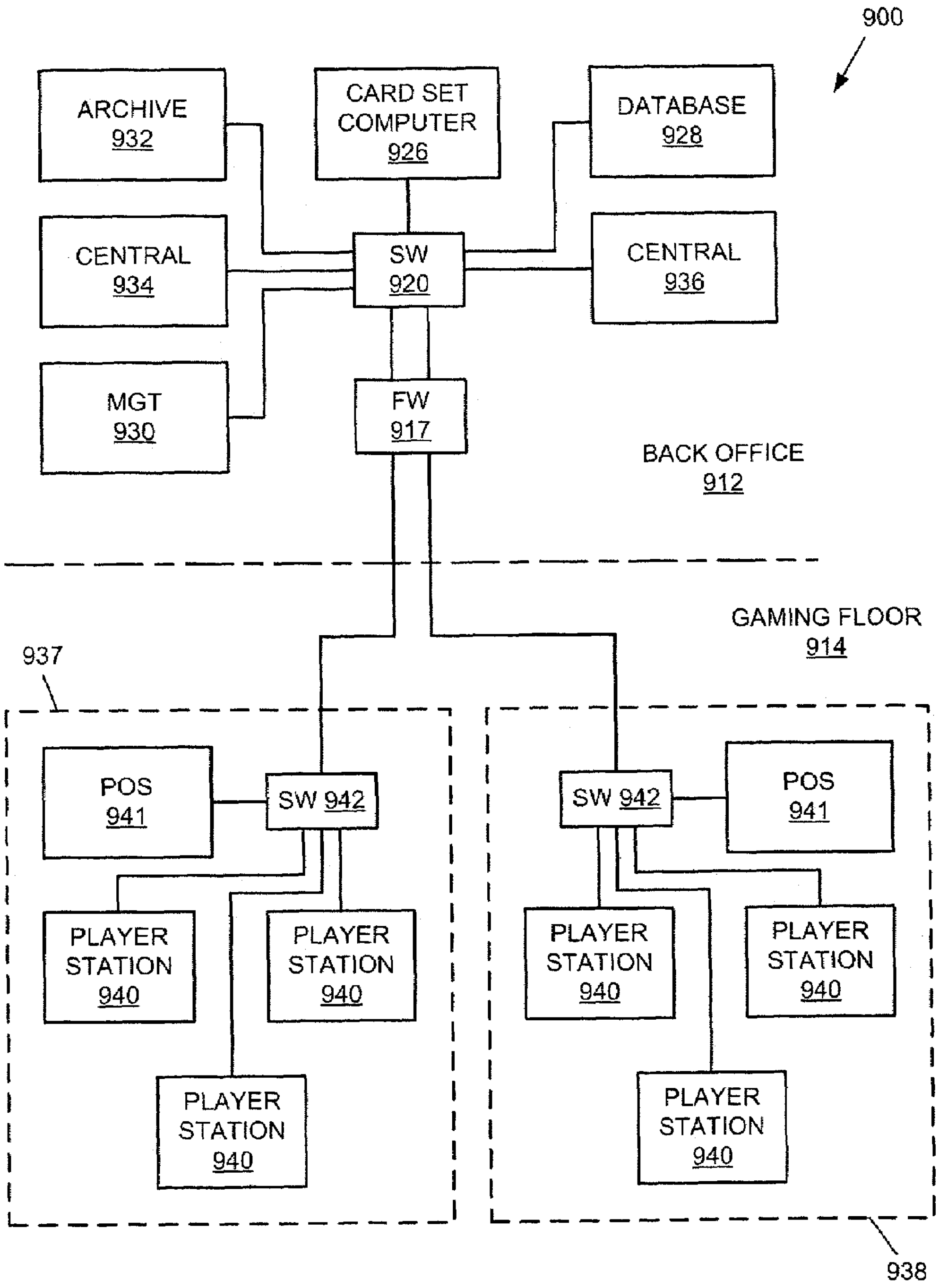
FIG. 9 is a diagrammatic representation of a bingo gaming system through which the present invention may be implemented.
Figure 10:
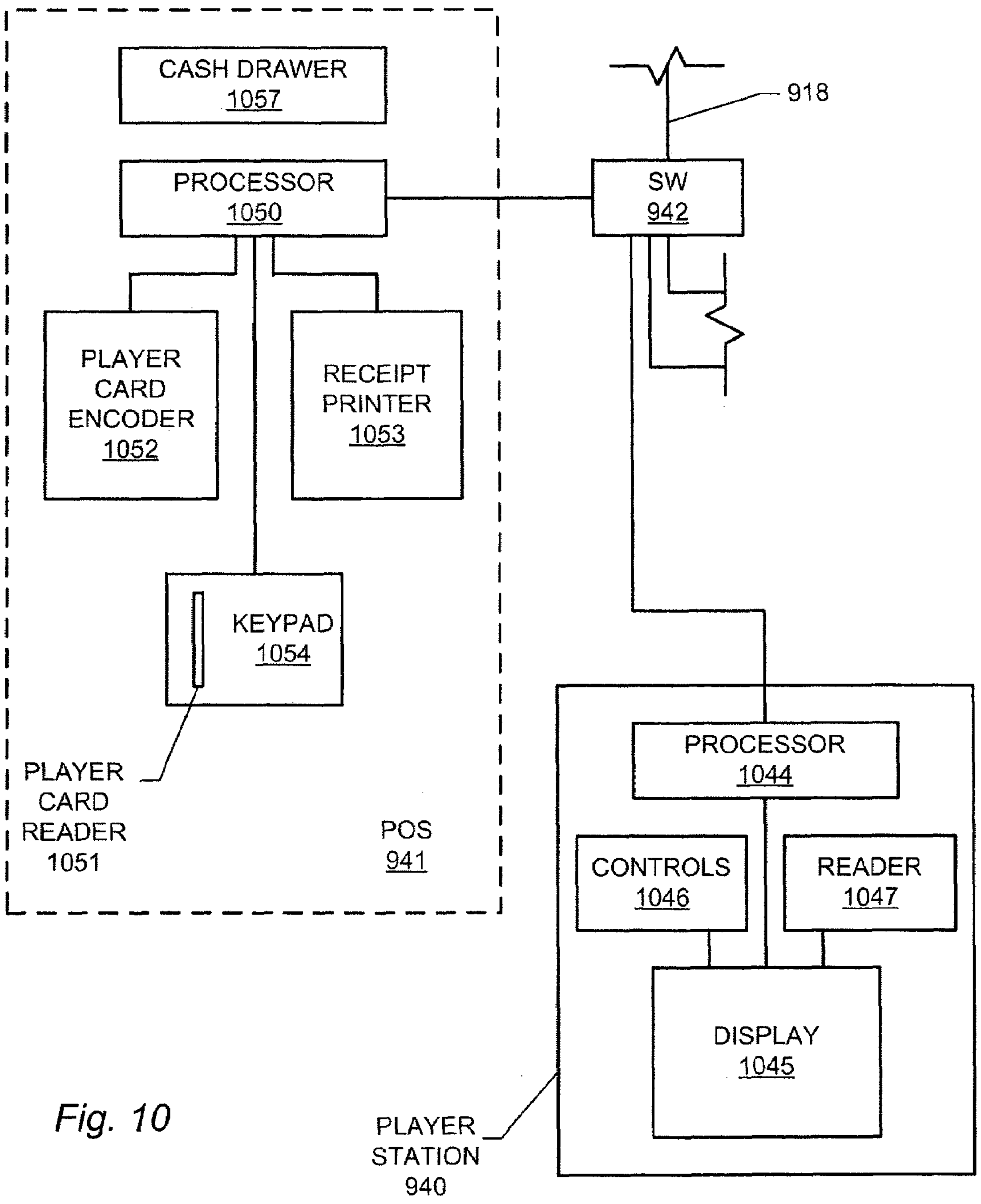
FIG. 10 is a diagrammatic representation of a point-of-sale terminal and player station included in the bingo gaming system shown in FIG. 9.

FIGS. 9 and 10 illustrate a bingo gaming system 900 in which the present invention may be used to assign prizes to the various participating players. The particular bingo gaming system 900 shown in FIG. 9 and used as an example here is the bingo gaming system disclosed in detail in U.S. patent application Ser. No. 10/028,889, now U.S. Pat. No. 6,802,776. Rather than the traditional bingo game sequence in which players submit cards for a bingo game, and the bingo designations are then drawn to identify a winning pattern for the bingo game (and potentially other patterns than pay a prize), bingo gaming system 900 pre-matches a set of bingo cards with a ball draw to produce a win/loss record (a game play record) for each bingo card in the set. The game play records are then stored and assigned to players who submit a request for a play in the gaming system from any one of a number of player stations supported by the system. Although this pre-matching type system 900 is used here as an example in which the present invention may be implemented, it will be appreciated that the present invention may be implemented in a standard sequence bingo gaming system as well and is not limited to applications in a pre-matching type bingo gaming system.

Referring now to FIG. 9, bingo gaming system 900 includes a back office system 912 and a gaming floor system 914 with a secure communications arrangement that facilitates communications between the back office system and the gaming floor system. Security may be enhanced with hardware firewalls 917 connected in the communications lines 918 which extend to gaming floor system 914 and/or by firewall software operating on the various computers that make up back office system 912.

Back office system 912 includes a number of separate data processing devices interconnected through a suitable communications arrangement. In the illustrated form of the invention, back office system 912 comprises a local area network of individual data processing devices and includes a switch 920 to which each separate data processing device connects. The two floor system communication links 918 also connect into switch 920.

The illustrated form of back office system 912 shown in FIG. 9 includes one or more card set computers 926, a database computer 928, a management computer 930, an archive computer 932, and two separate central computers 934 and 936. Card set computer 926 produces and stores one or more matched bingo card sets, each matched bingo card set including a number of game play records. Each game play record corresponds to an individual bingo card representation in a set of bingo card representations used in creating the matched bingo card sets. The matched bingo card sets, or rather, data representing the matched bingo card sets, are stored in a suitable storage device associated with card set computer 926 until a new or unused set is requested by one of the central computers 934 or 936. At that time, one or more of the matched bingo card sets is communicated to the requesting central computer. Card set computer 926 may also be used to manufacture the set of bingo card representations to be used in the system. Alternatively, a set or perm of bingo card representations may be generated elsewhere and stored in card set computer 926 to be used in producing the desired matched bingo cards sets. It will be noted that the invention requires only a single set of bingo card representations to be used in creating numerous matched card sets; however, different sets of bingo card representations may be used to create matched bingo card sets within bingo gaming system 900.

In the bingo gaming system shown in FIG. 9, card set computer 926 may also control a local object draw device or other game designation generating device (not shown) and receive sets of game designations from that device. Where software code is executed to generate the required sets of game designations (that is, a set of designations representing a draw for a bingo game), the game designation generation code may be executed by card set computer 926. As a further alternative, the object draw or other device may include its own dedicated controller or processor which supplies sets of game designations to card set computer 926.

Each central computer 934 and 936 is programmed to communicate with card set computer 926, database computer 928, and with a particular group of gaming floor devices. FIG. 9 shows two separate groups of gaming floor devices, group 937 and group 938, for purposes of example. Central computer 934 is programmed to communicate with each of the gaming floor devices in group 937, while central computer 936 is programmed to communicate with each of the gaming floor devices in group 938.

Each central computer 934 and 936 stores data representing one or more matched bingo card sets provided from card set computer 926 for use by the gaming floor devices as described below. Each central computer also receives information from the various gaming floor devices in the respective group. Some of this information is stored in database computer 928. For example, central computer 934 receives requests from devices in group 937 to open a player account, add funds to a player account, and withdraw funds from a player account. Central computer 934 also receives game play requests from devices in group 937 and sends game play record information, particularly prize information identified according to the present invention as described above, to the respective device in the group from which the respective game play request was received.

The multiple central computer arrangement shown in FIG. 9 provides several advantages. First, in the event that one of the central computers 934 or 936 experiences a technical problem which prevents it from operating properly, only a single group of gaming floor devices is affected. Second, the multiple central computer arrangement shown in FIG. 9 is readily scalable to increase or decrease the number of gaming floor devices supported by the system. Furthermore, the multiple central computer arrangement allows faster communications with the gaming floor devices and therefore increases the speed at which a player may play the game or games offered through gaming system 900.

Database computer 928, along with its associated data storage device or devices, serves as a data storage repository for storing all player records and system usage information. Most importantly, database computer 928 stores in its associated data storage a player account table having entries corresponding to the various player accounts. The player account information includes, for example, the player's name, the player's account identifier or number, in some cases a personal identification number (PIN) for the player, and perhaps other player information personal to the particular player. Database computer 928 may also collect and store usage information indicating the gaming floor devices players have used, and the extent of use.

Numerous different database structures for use in database computer 928 will be apparent to those of ordinary skill in database development and application. Bingo gaming system 900 may employ any suitable database structure for maintaining the player and other information required in the operation of the gaming system.

Management computer 930 operates under the control of management software to provide system reports including real-time reports and system usage and performance reports of interest to the system operators, managers, or regulators. The software executed at management computer 930 also may be used to schedule administrative functions required or helpful for the database computer system 928. Management computer 930 may include a suitable display for providing a user interface and for displaying reports and other information. Although not shown in FIG. 9, a printer may also be included in the back office portion of the network or may be connected directly to management computer 930 for printing system reports and usage records.

In the preferred form of bingo gaming system 900, central computers 934 and 936 send used matched bingo card sets back to card set computer 926. Card set computer 926 then periodically sends the used matched bingo card sets to archive computer 932 which serves as a repository for used matched bingo card sets. Archive computer 932 is also preferably used to store a copy of each complete unused matched bingo card set as well. These unused matched bingo card set copies and used matched bingo card sets may be archived or stored in any suitable fashion in a nonvolatile memory or storage device associated with the archive computer 932.

Referring now to the gaming floor devices shown in FIG. 9, each group 937 and 938 includes a number of player stations 940 and a point-of-sale or cashier terminal (P05) 941, all connected to a local area network communications hub (SW) 942. Although not shown in the figure, each group may also include one or more remote point-of-sale (RPOS) terminals, and one or more kiosks also connected to the communications hub 942. The communications hub 942 of each gaming floor group is connected to switching hub 920 of the back office system 912 through one of the communications lines 918.

As shown in FIG. 10, each player station 940 includes a computer system having a processor 1044, a touch screen display 1045, a control panel 1046, and a player card reader 1047. Player station software executed by processor 1044 receives information from player card reader 1047 to log a player into the respective central computer (934 or 936), and then allow the player to participate in the games available through the player station by submitting game play requests to purchase pre-matched bingo card representations and thereby receive results in the gaming system. The player station software also causes display 1045 to show a player the results of play as dictated by the bingo result associated with the purchased bingo card representation/game play record.

It will be appreciated that the player stations may include other hardware depending upon the particular implementation of the gaming system. For example, it may be desirable for a player to add money to his or her account at the player station or simply add money for a wager at the player station. In these instances, player station 940 may also include a token, coin, or bill accepting device not shown in the present drawings, or some other device for accepting some form of payment at the player station. Although the illustrated "cashless" gaming arrangement comprises one preferred implementation for gaming system 900, it will be appreciated that the gaming system is not limited to this preferred "cashless" gaming system or to any other system for interacting with the game players.

The example POS terminal 941 shown in FIG. 10 enables a player to open an account with the gaming system, add funds to his or her account, and close or cash out his or her account. In alternative forms of the invention, POS terminal 941 may allow a player to actually initiate a game play request and receive results in the form of a printed ticket. POS terminal 941 comprises a computer system having a processor 1050 and a player/cashier interface including a player card reader 1051, player card printer/encoder 1052, a receipt printer 1053, and keypad 1054. POS terminal 1041 also includes a cash drawer 1057 which is accessible by a POS cashier or attendant.

The above-described preferred embodiments are intended to illustrate the principles of the invention, but not to limit the scope of the invention. Various other embodiments and modifications to these preferred embodiments may be made by those skilled in the art without departing from the scope of the following claims. It will be appreciated that the invention applies equally to bingo-type games using paper cards or bingo-type games using data structures to define game cards. Also, although the present invention has particular application to bingo-type games as described in U.S. Pat. No. 6,802,776 the prize assignment method according to the invention may be used with other bingo-type games, including traditional bingo games.

The invention claimed is:

1. A method including:

(a) selecting a prize distribution for a bingo gaming system, the prize distribution comprising a number of winning prize levels, each winning prize level having a respective prize to be awarded for that winning prize level and having a respective prize level probability, the respective prize level probability for a respective winning prize level comprising a desired probability of winning the prize at that respective winning prize level;

(b) defining a number of target bingo patterns achievable in the bingo gaming system, each target bingo pattern having a respective corresponding probability comprising the probability of achieving that respective bingo pattern in a bingo game conducted through the bingo gaming system;

(c) after selecting the prize distribution and defining the number of target bingo patterns, for one or more winning prize levels of the prize distribution, (i) identifying two or more target bingo patterns such that the probability of achieving any one of the identified two or more target bingo patterns in a respective bingo game conducted through the bingo gaming system approximates the desired probability of winning the prize at the respective winning prize level, and (ii) correlating the identified two or more target bingo patterns to the respective winning prize level, and (iii) removing the identified two or more target bingo patterns from the group of target bingo patterns;

(d) for a winning prize level of the prize distribution for which (c) is not performed, (i) identifying a target bingo pattern having a respective corresponding probability that approximates the desired probability of winning the prize at that respective winning prize level, and (ii) correlating the identified target bingo pattern to that respective winning prize level, and (iii) removing the identified target bingo pattern from the group of target bingo patterns;

(e) continuing (c) and (d) until each winning prize level of the prize distribution is correlated to one or more target bingo patterns;

(f) with a data processing system in the bingo gaming system, (i) identifying a respective bingo result for each of a number of plays in the bingo gaming system, each respective bingo result comprising a pattern in which locations are matched on a respective bingo card for the respective play, and (ii) for each respective bingo result, searching the target bingo patterns that have been correlated to any of the winning prize levels and determining if the pattern for that bingo result comprises one of the target patterns correlated to a respective winning prize level;

(g) in the event the pattern for a respective bingo result comprises one of the target patterns correlated to one of the winning prize levels, identifying the prize at that prize level with the data processing system and awarding the prize at that prize level for the respective play and causing a player station for that play to display the awarded prize; and (h) in the event the pattern for a respective bingo result does not comprise one of the target bingo patterns correlated to one of the winning prize levels, causing a player station for that play to display a loss.

2. The method of claim 1 wherein for a respective prize level correlated to two or more target bingo patterns, a first one of the target bingo patterns assigned to the respective prize level is defined by a first number of symbol locations and a second one of the target bingo patterns assigned to the respective prize level is defined by a second number of symbol locations, the first number of symbol locations being unequal to the second number of symbol locations.

3. The method of claim 1 wherein two respective prize levels are each correlated to two or more target bingo patterns.

4. The method of claim 1 wherein three respective prize levels are each correlated to two or more target bingo patterns.

5. The method of claim 1 wherein one respective prize level is correlated to three target bingo patterns.

6. The method of claim 1 wherein one respective prize level is correlated to four target bingo patterns.

7. The method of claim 1 wherein at least one of the prize levels correlated to two or more target bingo patterns includes a first target bingo pattern associated with a first pattern probability and also includes a second target bingo pattern associated with a second pattern probability, and wherein the first pattern probability is unequal to the second pattern probability.

8. The method of claim 1 wherein at least one of the prize levels correlated to two or more target bingo patterns includes a first target bingo pattern having a first shape and a second target bingo pattern having a second shape, and wherein the first shape is different from the second shape.

9. A method of emulating a desired prize distribution in a bingo gaming system in which the result of each play is determined by the manner in which the bingo card for the play matches a set of drawn bingo designations, the method including:

(a) selecting a prize distribution for the bingo gaming system, the prize distribution comprising a number of winning prize levels, each winning prize level having a respective prize to be awarded for that winning prize level and having a respective prize level probability, the respective prize level probability for a respective winning prize level comprising a desired probability of winning the prize at that respective winning prize level;

(b) defining a number of target bingo patterns achievable in the bingo gaming system;

(c) after selecting the prize distribution and defining the target bingo patterns, correlating each winning prize level to at least one respective target bingo pattern and correlating at least one winning prize level to two or more respective target bingo patterns such that (i) no target pattern is correlated to more than one of the winning prize levels, and (ii) the probability of achieving in the bingo gaming system any one of the one or more target bingo patterns correlated to a respective winning prize level comprises a value approximating the prize level probability for that respective winning prize level;

(d) with a data processing system in the bingo gaming system, (i) identifying a respective bingo result for each of a number of plays in the bingo gaming system, each respective bingo result comprising a pattern in which locations are matched on a respective bingo card for the respective play, and (ii) for each respective bingo result, searching the target bingo patterns that have been correlated to any of the winning prize levels to determine if the pattern for that respective bingo result comprises one of the target patterns correlated to a respective winning prize level; and (e) in the event the pattern for a respective bingo result comprises one of the target patterns correlated to a respective winning prize level, awarding the prize at that prize level for the respective play and causing a player station for that play to display the awarded prize.

10. The method of claim 9 wherein for a respective prize level correlated to two or more target bingo patterns, a first one of the target bingo patterns assigned to the respective prize level is defined by a first number of symbol locations and a second one of the target bingo patterns assigned to the respective prize level is defined by a second number of symbol locations, the first number of symbol locations being unequal to the second number of symbol locations.

11. The method of claim 9 wherein two respective prize levels are each correlated to two or more target bingo patterns.

12. The method of claim 9 wherein three respective prize levels are each correlated to two or more target bingo patterns.

13. The method of claim 9 wherein one respective prize level is correlated to three target bingo patterns.

14. The method of claim 9 wherein one respective prize level is correlated to four target bingo patterns.

15. The method of claim 9 wherein at least one of the prize levels correlated to two or more target bingo patterns includes a first target bingo pattern associated with a first pattern probability and also includes a second target bingo pattern associated with a second pattern probability, and wherein the first pattern probability is unequal to the second pattern probability.

16. The method of claim 9 wherein at least one of the prize levels correlated to two or more target bingo patterns includes a first target bingo pattern having a first shape and a second target bingo pattern having a second shape, and wherein the first shape is different from the second shape.

* * * * *